United States Patent [19]
Craig et al.

[11] 3,950,172
[45] Apr. 13, 1976

[54] INTRA PACKET FILM PROCESSING METHOD AND APPARATUS

[75] Inventors: Dwin R. Craig, Gaithersburg; Marvin Phillip Sirkis, Rockville, both of Md.

[73] Assignee: Insite Corporation, Gaithersburg, Md.

[22] Filed: Dec. 10, 1973

[21] Appl. No.: 423,568

[52] U.S. Cl. .................... 96/61 M; 96/50 R; 96/63; 250/475; 250/477

[51] Int. Cl.$^2$.. G03C 5/30; G03C 5/16; G03B 41/16

[58] Field of Search........ 96/63, 61 M, 50; 354/324; 250/475, 477

[56] References Cited

UNITED STATES PATENTS

| | | | |
|---|---|---|---|
| 3,069,266 | 12/1962 | Land | 96/63 |
| 3,575,099 | 4/1971 | Levenson et al. | 354/307 |
| 3,782,936 | 1/1974 | Abbott et al. | 96/3 |

*Primary Examiner*—Mary F. Kelley
*Attorney, Agent, or Firm*—Blair & Brown

[57] ABSTRACT

An intra packet film processing method and apparatus which includes the injection of a monobath film processing solution into a film packet by means of a hypodermic needle so as to uniformly coat the emulsion surfaces of the film while remaining in a light-tight condition in the packet. Since the film in most instances has emulsion surfaces on both sides thereof hypodermic needles are inserted from opposite sides so as to uniformly coat both surfaces of the film. The film is supported so that its outer ends may flex away from the needle as the needle is caused to penetrate the covering surfaces of the film. The flexing of the film reduces the attack angle of the needle and allows the tip of the needle to slide along the film surfaces without penetrating the film. Either the needles or the film are rotated about an axis extending through the plane of the film so as to engage both needles with opposite surfaces of the film packet to uniformly penetrate the covering materials of the packet.

1 Claim, 5 Drawing Figures

INTRA PACKET FILM PROCESSING METHOD AND APPARATUS

BACKGROUND OF THE INVENTION

FIELD OF THE INVENTION

The present invention relates to an intra packet film processing method and apparatus for uniformly coating the emulsion surfaces of a film in a packet with a monobath processing solution.

SUMMARY OF THE INVENTION

The method of the present invention is directed to the processing of intra oral dental film packets while leaving the film in the light-tight packet. The film is mounted to permit it to be rotated relative to a pair of hypodermic needles which pierce opposite sides of the film packet to reach the opposite surfaces of the film. The film packet is permitted to flex as it is penetrated by the needles which reduces the angle of attack and allows the tip of the needle to slide along the film surface without penetrating the film. Either the film packet or the needles may be rotated about an axis extending through the plane of the film.

The primary object of the invention is to provide a film processing method and apparatus for processing a film in its light-tight packet without removing it from the packet so that the film may be developed without resorting to a darkroom.

Other objects and advantages will become apparent in the following specification when considered in light of the attached drawings.

DESCRIPTION OF THE PREFERRED EMBODIMENT

Figure 1:
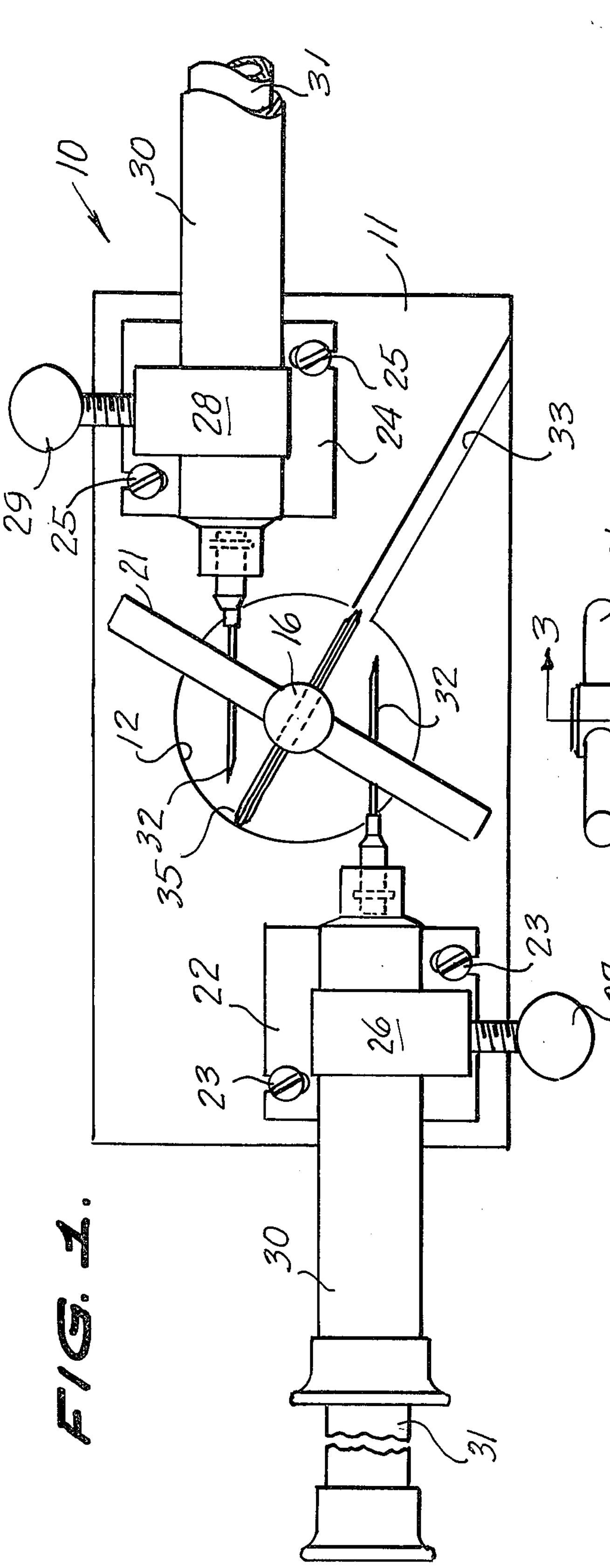
FIG. 1 is a top plan view of the invention.
Figure 2:
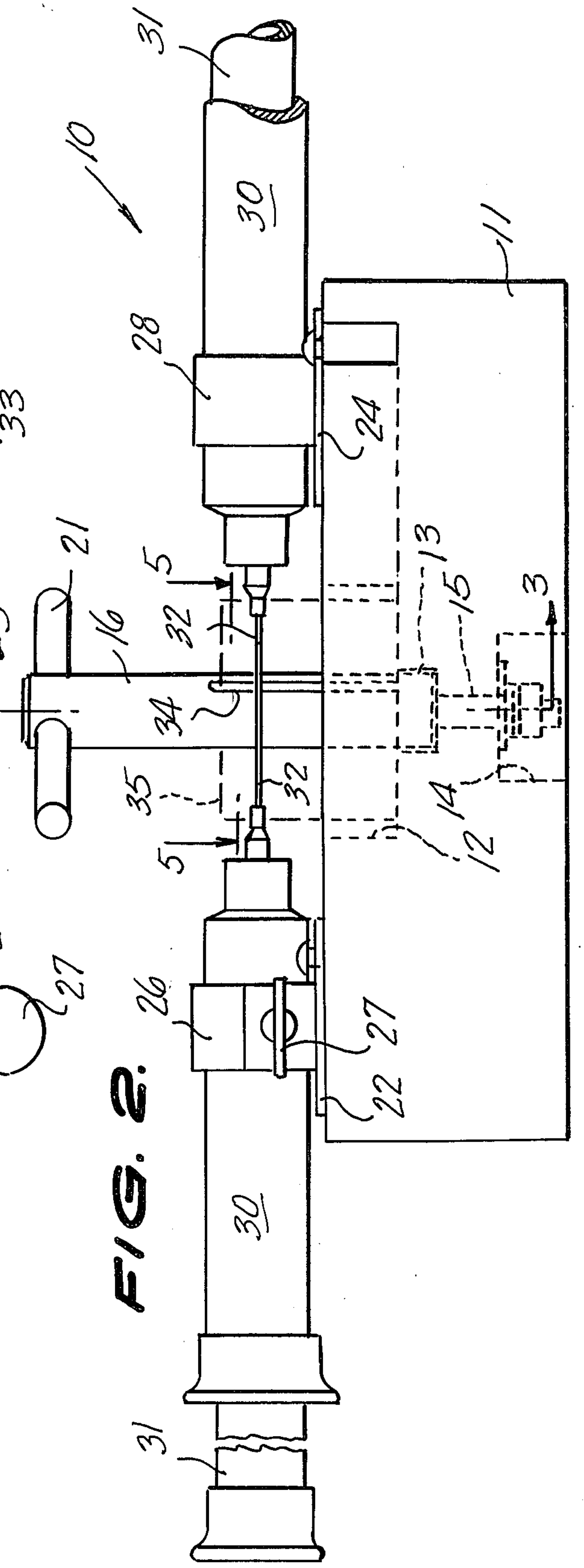
FIG. 2 is a side elevation of the invention.

Referring now to the drawings in detail, wherein like reference characters indicate like parts throughout the several figures, the reference numeral 10 indicates generally, an intra packet film processing apparatus constructed in accordance with the invention.

Figure 3:
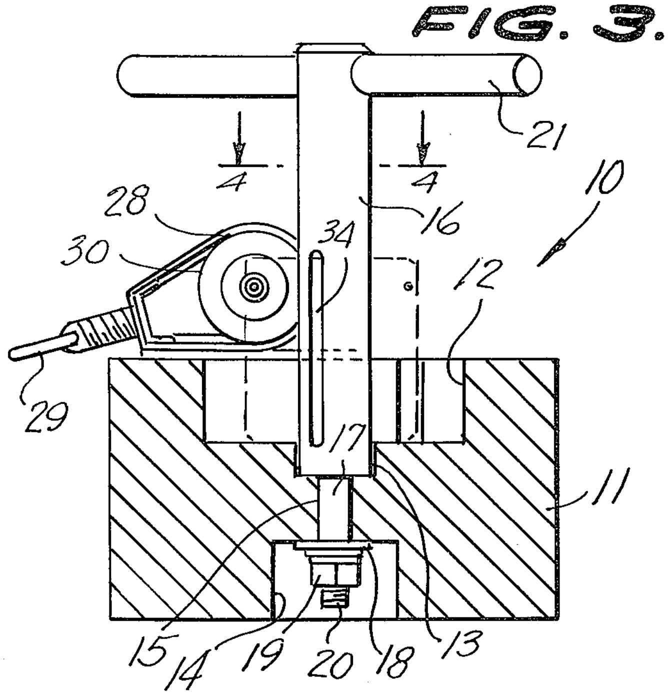
FIG. 3 is a vertical sectional view, taken along the line 3—3 of FIG. 2, looking in the direction of the arrows.

The apparatus 10 includes a generally rectangular base block 11 having a bore 12 opening downwardly into the upper surface thereof. A bore 13 extends axially inwardly from the lower end of the bore 12 as can be clearly seen in FIG. 3. A bore 14 opens upwardly from the lower surface of the block 11 in axially aligned relation to the bores 12 and 13. A bore 15 extends axially of the bores 12, 13, 14 and communicates the bore 13 with the bore 14.

A post 16 is journaled in the bore 13 and has a reduced diameter portion 17 extending downwardly through the bore 15. Washers 18 are mounted on the lower end of the reduced diameter portion 17 and a nut 19 engages over a threaded extension 20 of the reduced diameter portion 17 to engage against the washers 18 to lock the post 16 to the base 11. The post 16 may turn freely in the base 11 when moved by the hand actuated handle 21 secured to the upper end of the post 16.

A clamp base 22 is adjustably secured to the base 11 by screws 23. A second clamp base 24 is adjustably secured to the base 11 by screws 25. A clamp 26 is secured to the clamp base 22 and has a thumb screw 27 associated therewith. A clamp 28 is supported on the clamp base 24 and has a thumb screw 29 associated therewith. A hypodermic cylinder 30 is clamped in each of the clamps 26, 28 and has a conventional plunger 31 associated therewith. Hypodermic needles 32 are mounted on the cylinders 30 for reasons to be assigned.

The block 11 has an elongate slot 33 extending angularly thereacross communicating with one side edge of the block 11 and with the bore 12. A slot 34 extends transversely of the post 16 through the axis of the post 16 and is adapted to align with the slot 33 when the post 16 is rotated.

Figure 4:
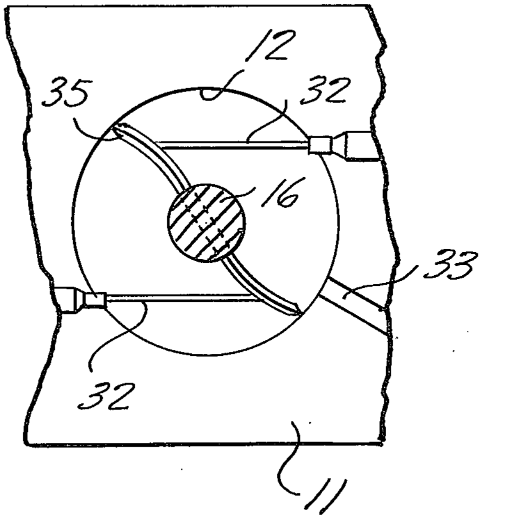
FIG. 4 is a fragmentary vertical sectional view, taken along the line 4—4 of FIG. 3, looking in the direction of the arrows.
Figure 5:
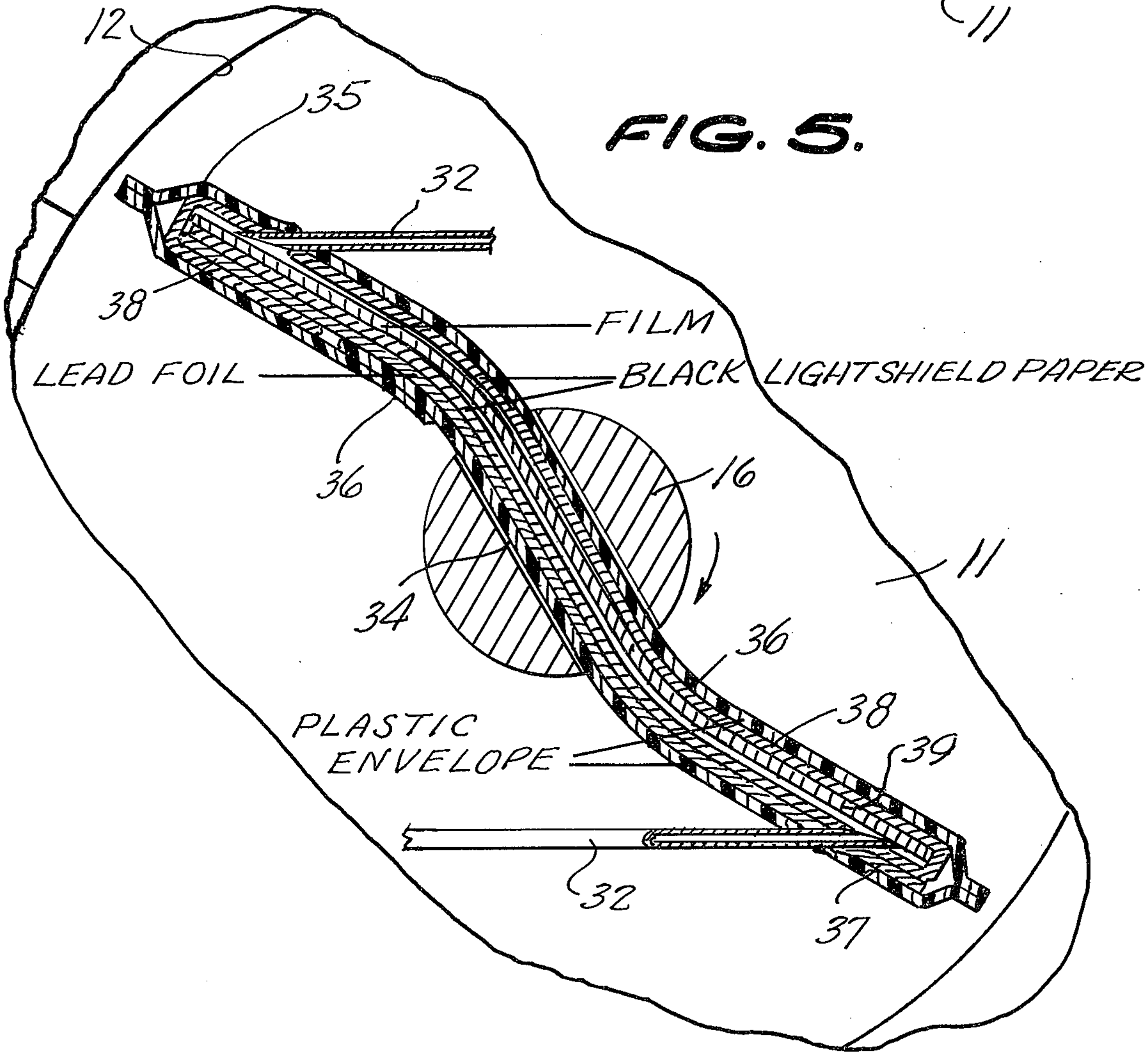
FIG. 5 is a grossly enlarged horizontal sectional view, taken along the line 5—5 of FIG. 2, looking in the direction of the arrows.

An intra oral dental film packet 35 is adapted to be inserted in the slot 34 of the post 16 by sliding along the slot 33 until it reaches the position illustrated in FIGS. 1, 4 and 5. With the film packet positioned in the slot 34 the handle 21 is grasped and the post 16 is turned so as to bring the opposite faces of the film packet 35 into contact with the sharp ends of the hypodermic needles 32. As can be seen in FIG. 5 the needles 32 penetrate the plastic envelope 36 of the packet 35 with one of the needles 32 penetrating the lead foil layer 37. Both of the needles then penetrate the black light shield paper 38 on opposite sides of the film 39. With the needles piercing the covering layers of the film 39 monobath developer and fixing solution contained in the hypodermic cylinders 30 are forced through the hypodermic needles 32 into engagement with the opposite surfaces of the film 39 so as to develop and fix the film 39 within the packet 35.

The method of the invention involves the development of the exposed x-ray film rapidly and simply in the operatorium of the dentist under normal lighting and using film packets which are almost universally conventionally used by the dental profession.

The method includes the steps of injecting a monobath processing solution into the film packet by means of a hypodermic needle so as to uniformly coat the emulsion surface of the film. Since most dental x-ray film carries an emulsion on both sides thereof the processing solution must be injected so as to reach both sides.

A monobath solution is a single solution which combines the developer and fixer such as TC-4D manufactured by Townley Chemical Corporation; Dentech solution manufactured by Kodak Limited; or any other single solution which can develop the exposed portions of the x-ray image and render the unexposed portions insensitive to light all in one step. Furthermore it is desirable to use a formulation which can be heated in order to accelerate the chemical reaction of the development and fixing.

Exhaustive experiments have shown that successful injection, with uniform coverage, can occur only when the hypodermic needle penetrates all protective layers of the packet; with the needle tip resting on the emulsion prior to injection of the solution. In order to penetrate the outer layers covering the film it is necessary to enter through the surface of the packet (not an edge)

with the needle angled at about 30 degrees to the surface. The needle must advance at that angle until its tip reaches the film surface. The film, being polycarbonate, is much harder than its covering layers and tends to prevent penetration by the needle providing the needle or film is allowed to flex, reducing the attack angle, and allowing the tip of the needle to slide along the film surface. Proper entry will show a fine line scratch in the emulsion making it desirable to penetrate the surface near an edge of the packet, outside of the normal image area of importance to the dentist.

Since the dental film of prime interest contains an emulsion on both sides, the invention includes two needles with both needles penetrating simultaneous the opposite sides of the film packet.

Normal monobath solutions of conventional liquid form failed to provide a uniform wetting of the film and a uniform development thereof. In order to provide a uniform development and fixing of the film it was discovered that the monobath had to be render viscous by the addition of thickeners so as to have the consistency of table syrup which prevented the flow of the monobath around the edge of the film to the back of the paper and provided sufficient force under normal injection pressure to force the paper away from the film surface as the thickened monobath moved thereover.

Thickening agents soluble in the high PH aqueous solution encountered in the monobaths proved suitable. Thickening agents commerically available which are useful in practicing the invention are carboxy methyl cellulose, colloidal oatmeal, fused silica "Cab-O-Sil" and poly acrylamide manufactured by American Cyanamide Company.

The present invention includes the method and apparatus by which a viscous monobath solution can be injected at both film surfaces of a multi-layered dental film packet through a pair of hypodermic needles which penetrate all protective layers with the tip of the needle resting in contact with opposite emulsion surfaces of the film. After suitable processing time the film packet can be opened for viewing in normal room light. It is obvious that the invention could also be applied to other types and sizes of x-ray film, still in the packet or light tight envelope in which it was exposed.

Having thus described the preferred embodiment of the invention it should be understood that numerous structural modifications and adaptations may be resorted to without departing from the spirit of the invention.

What is claimed is:

1. A method of insitu developing imagewise exposed X-ray dental film in a conventional flexible light tight film packet of the type having a film sheet carrying emulsion on both sides thereof and surrounded by a black light shield paper with a lead foil layer against one surface and a plastic envelope encompassing the film, paper and lead foil layer which includes the steps of penetrating the flat surfaces of the covering layers on one side of the packet with a hypodermic needle with the packet flexing in a direction away from the needle as the needle penetrates the packet, penetrating the flat surfaces of the covering layers on the other side of the packet with a hypodermic needle with the packet flexing away from the needle as the needle penetrates the packet injecting a viscous monobath processing solution into the area between the film emulsion and the paper on both sides of the film sheet of the film packet through the penetrating hypodermic needle on each side of the packet so as to uniformly coat the emulsion surfaces of the film, stripping the film cover from the processed film.

* * * * *